H. MATTFELD.
Water-Proof Walls.
No. 134,911.  Patented Jan. 14, 1873.
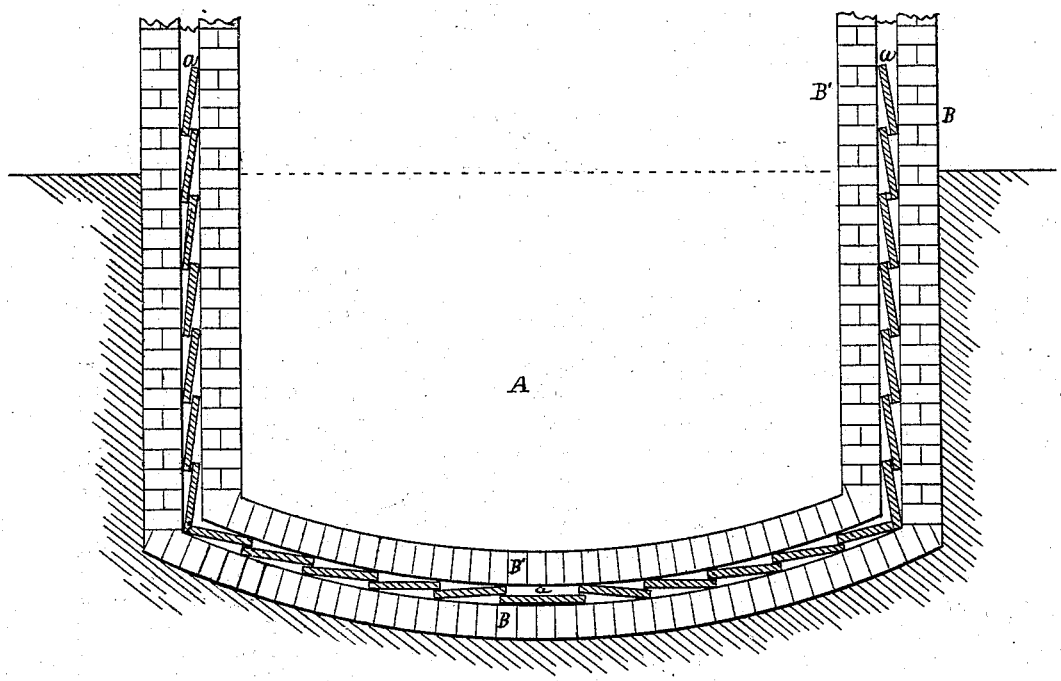

UNITED STATES PATENT OFFICE.

HERMANN MATTFELD, OF NEW YORK, N.-Y., ASSIGNOR OF ONE-HALF HIS RIGHT TO ISAAC COLEMAN, OF SAME PLACE.

IMPROVEMENT IN WATER-PROOF WALLS.

Specification forming part of Letters Patent No. 134,911, dated January 14, 1873.

*To all whom it may concern:*

Be it known that I, HERMANN MATTFELD, of the city, county, and State of New York, have invented a new and Improved Method for Making Walls Water-Tight; and I do hereby declare that the following is a full, clear, and exact description thereof, reference being had to the accompanying drawing and to the letters of reference marked thereon.

The object of my invention is to provide a cheap and water-tight wall and floor for cellars, where they are likely to be affected by heavy rains, tides, or springs. Various means have been unsuccessfully employed in endeavors to prevent water from entering into cellars in localities near tide-water and low, springy grounds. Among the means used for this purpose have been all the various kinds of hydraulic cement in connection with brick and stone, but all to no purpose, as all cements are more or less leechy, or so porous that the water would percolate so that soon more or less water would accumulate in the cellar; but by my invention this difficulty is overcome. The nature of my invention consists in the combination of an outer and inner brick or stone wall or their equivalents with glass laid between the said walls, the space between the walls being entirely filled with plates of glass and any of the well-known hydraulic cements. This plan is also carried in the perpendicular or side as well as the floor of the cellar, so there is no possibility of any leakage into the cellar.

To enable others skilled in the art to make and use my invention I will proceed to describe its construction and operation.

The figure represents a transverse sectional elevation of a cellar walled and floored with my invention.

Letters of like name and kind indicate like parts in the figure.

A represents the cavity of a cellar; B and B′, the inner and outer walls laid in Portland cement in the ordinary manner. In the space intervening between the brick walls B B′ are plates of glass, $a$, of any desired thickness and dimensions, which are made to overlap each other, as shown in the figure. The joints of glass may be laid in pitch or any other water-resisting substance suitable for the purpose, and the balance of space filled with best Portland cement.

From the figure it will be observed that I make the floor concave or the wall forming it crowning or arched downward, so that it will more effectually resist the pressure of water underneath and prevent the floor from being raised upward by the pressure.

My invention is the only plan that has yet been devised that will effectually prevent the water in localities near tides or springs from entering the cellar in greater or less quantity.

Having thus described my invention, what I claim as new, and desire to secure by Letters Patent of the United States, is—

The herein-described mode of constructing water-proof cellars, floors, and walls, viz: A double wall whose interior space contains the overlapping plates of glass or equivalent non-porous material with cemented edges, said space being afterward filled with grouting or Portland cement, substantially as described.

HERMANN MATTFELD.

Witnesses:
 CHAS. ROGERS,
 ISAAC COLEMAN.